United States Patent
Grabb et al.

[11] 3,768,366
[45] Oct. 30, 1973

[54] SELECTIVE PRESSURE DIFFERENTIAL REINFORCING MEANS

[75] Inventors: Frederick G. Grabb; Maxwell L. Cripe; Delbert J. Gardner, all of South Bend, Ind.

[73] Assignee: The Bendix Corporation, South Bend, Ind.

[22] Filed: Oct. 2, 1972

[21] Appl. No.: 294,131

[52] U.S. Cl.............................. 91/1, 91/6, 91/29, 60/428, 60/430
[51] Int. Cl. ... F01b 31/12, F01b 25/02, F15b 13/04
[58] Field of Search ............... 91/1, 6, 28, 29; 60/428, 430, 486; 137/625.48, 625.5

[56] References Cited
UNITED STATES PATENTS
3,434,388   3/1969   Julow et al................. 91/6
1,103,036   7/1914   Clark......................... 91/29

Primary Examiner—Martin P. Schwadron
Assistant Examiner—A. M. Zupcic
Attorney—Leo H. McCormick, Jr. et al.

[57] ABSTRACT

A switching apparatus for selectively diverting the air flow from a pump to a servomotor to create an operational pressure differential across a vacuum suspended wall in response to an operational signal indicating the need for an intensified pressure differential.

12 Claims, 3 Drawing Figures

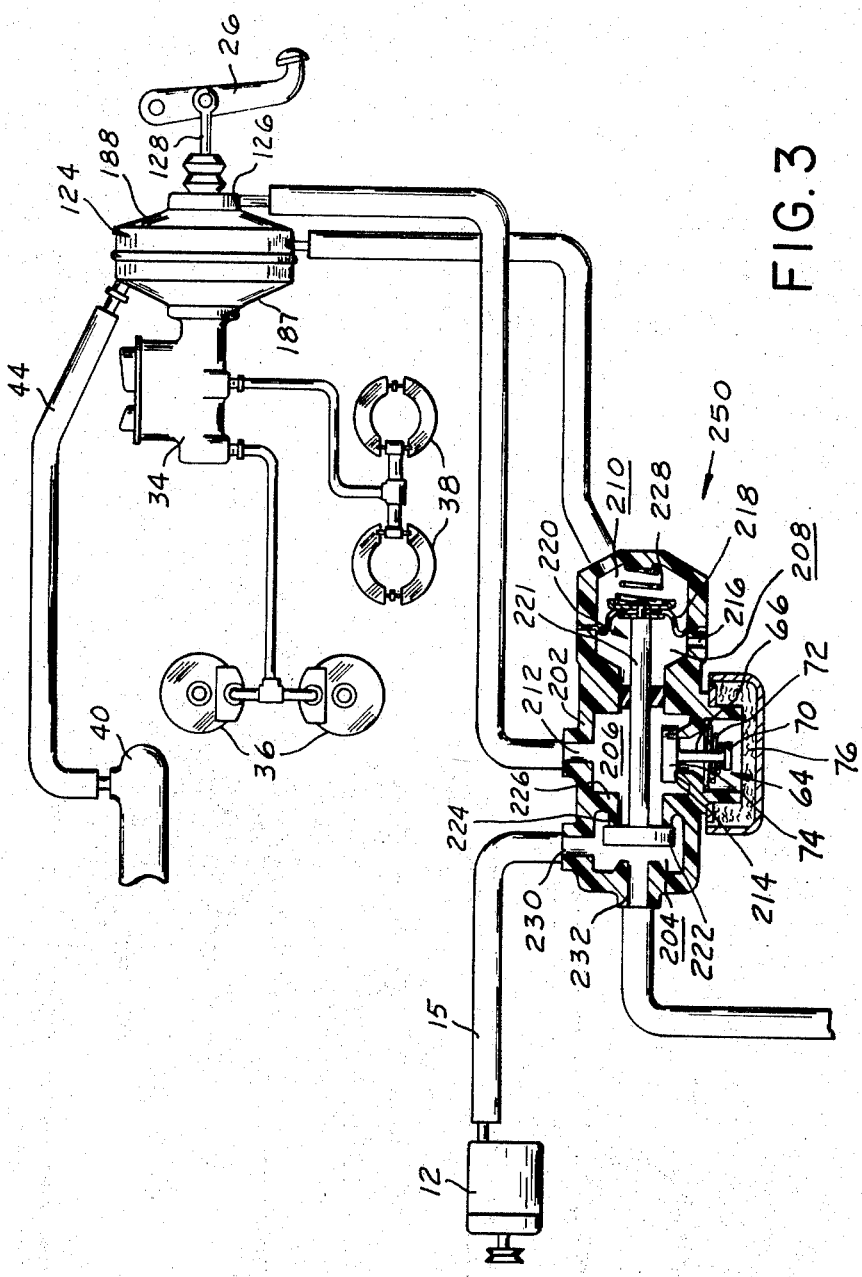

SELECTIVE PRESSURE DIFFERENTIAL REINFORCING MEANS

BACKGROUND OF THE INVENTION

Automobiles equipped with emission control apparatus and modifications required to tune conventional components for the purpose of reducing engine emission have a reduced vacuum level developed at the intake manifold. Thus, the available vacuum formerly available for creating an operational pressure differential in the servomotor powering the braking system has correspondingly been reduced.

In an attempt to maintain this operational pressure differential within limits to supply a master cylinder with an adequate input force, a reservoir of compressed air was adapted to be continually communicated to the servomotor upon a brake application, see copending U. S. application Ser. No. 217,983, owned by the same assignee of this application and incorporaties herein by reference. However, later tests revealed that for normal braking conditions the available pressure differential developed by air at atmospheric pressure and engine intake manifold vacuum was completely adequate. Only during panic stops is this pressure differential inadequate to produce sufficient output to bring a vehicle to a stop within set safety standards.

SUMMARY OF THE INVENTION

Realizing that each brake application does not require additional air pressure over atmospheric air pressure, we have devised a means for utilizing the air flow associated with the emission controls to reinforce the pressure differential upon the development of an operational output signal. The operational signal is sensed in a switching means and operates a valve means for adding the air flow of the emission control pump into the operational pressure differential of the servomotor.

It is therefore the object of this invention to selectively provide a pressure differentially operated servomotor with an additive air flow to reinforce the pressure differential in response to a sensed operational signal.

It is still another object of this invention to provide a means of selectively switching a vacuum and atmospheric air pressure operated servomotor to a vacuum and compressed air pressure operated servomotor.

It is still a further object of this invention to provide a switching means responsive to an operational signal for selectively reinforcing a pressure differential in a servomotor for providing an output to activate a master cylinder in a power braking system.

It is still a further object of this invention to provide a means of automatically cycling a switching means upon engaging the ignition of an automobile to provide a visual indication of the operativeness of the switching means.

These and other objects will become apparent from reading this specification and viewing the drawings.

BRIEF DESCRIPTION OF THE DRAWINGS

FIG. 3 is a schematic illustration of a braking system for a vehicle wherein air from an emission control pumping means is switched from the exhaust system of the vehicle to provide a servomotor with a controlled predetermined operational pressure differential for powering a pressure intensifier in the braking system.

DETAILED DESCRIPTION OF THE PREFERRED EMBODIMENT

Figure 1:
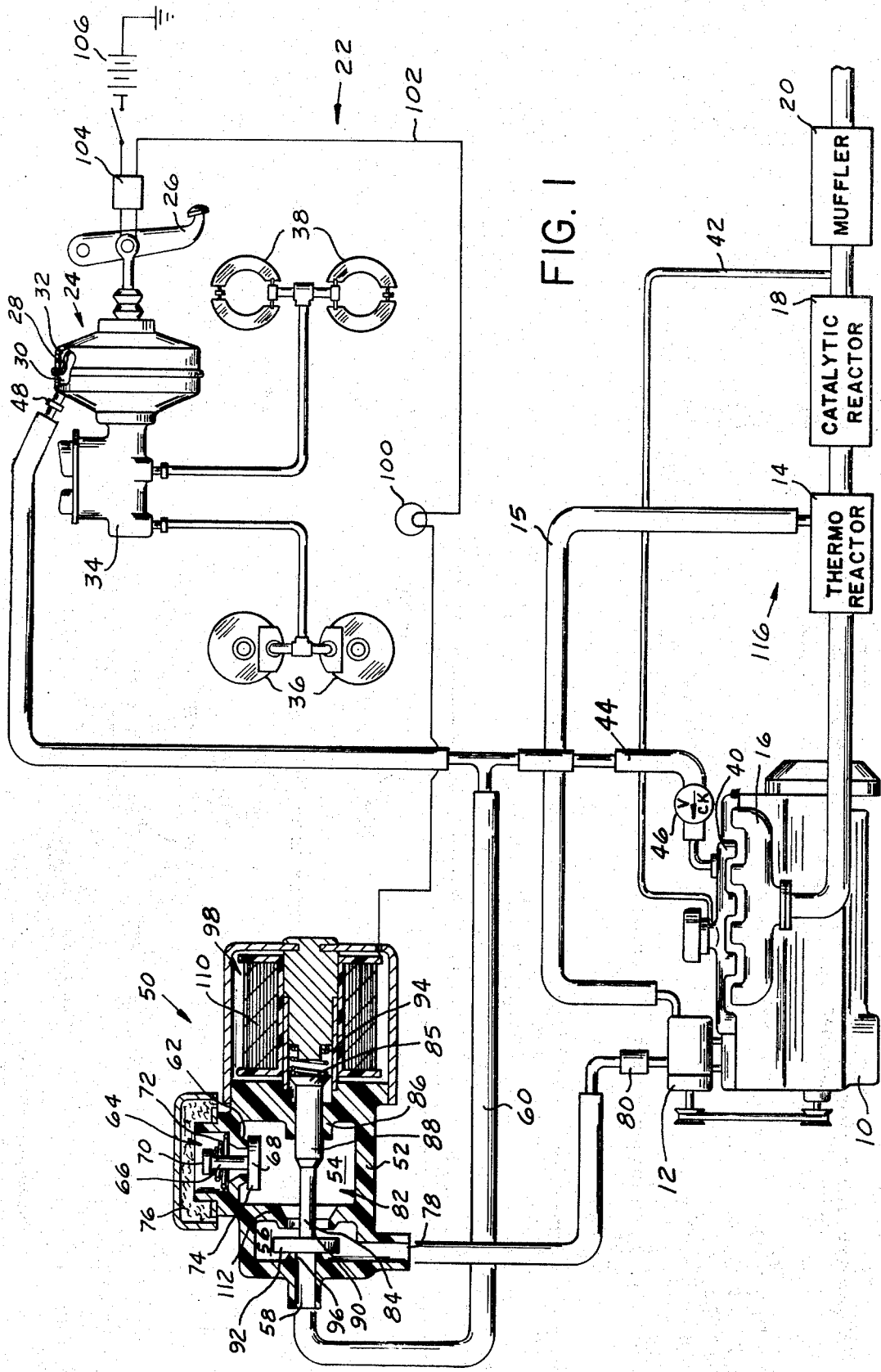
FIG. 1 is a schematic illustration of a vehicle equipped with an emission control means and power braking means connected together by switching means responsive to an operational signal to reinforce a pressure differential operated servomotor which powers a fluid intensifier in the braking system.

In FIG. 1 there is shown an automobile engine 10 having an emission control pump 12 which supplies a thermo reactor 14 with air under pressure through conduit 15 to mix with exhaust gases transmitted from the exhaust manifold 16 into a catalytic reactor 18 where unburned gases and air polluting gases are reduced to acceptable levels before exiting into the atmosphere through a muffler 20. A braking system 22 having a servomotor 24, of a type fully described in U. S. Pat. No. 3,106,873, incorporated herein by reference, which is activated by an operator pushing on pedal 26 to interrupt vacuum communication across a wall means 28 from a front chamber 30 to a rear chamber 32. Upon interruption of the vacuum communication to the rear chamber 32, air at atmospheric pressure is allowed to freely flow into the rear chamber 32 and create a pressure differential across the wall means 28. This pressure differential will move the wall means 28 to supply an operational output force for energizing the master cylinder 34 of a type fully described in U. S. application Ser. No. 204,550 and incorporated herein by reference, which supplies fluid under pressure to operate the front brakes 36 and the rear brakes 38 of a vehicle.

The pressure differential across the wall means is determined by the vacuum level created at the intake manifold 40. This vacuum level is determined by many parameters such as timing of the vehicle's carburetor control setting but principally by the amount of recirculation gas transmitted in conduit 42 from the exhaust system. This recirculated gas will aid in reducing the oxides of nitrogen ($NO_x$) in the fuel used in the engine by lowering the temperature of combustion through dilution of the air entering through the intake manifold 40.

The vacuum available at the intake manifold 40 is communicated through conduit 44 past check valves 46 and 48 into the front chamber 30 of the servomotor 24. To be assured that the vacuum level in the front chamber 30 is within acceptable limits which can produce a pressure differential with atmospheric air upon actuation of the brakes in response to an operator demand, a switching means 50 diverts the air flow to the pumping means 12 from the atmosphere to the front chamber 30.

The switching means 50 includes a housing 52 having an atmospheric chamber 54 and a vacuum chamber 56. A first port 58 is connected through conduit 60 which is teed into conduit 44. A second inlet port 62 is controlled by a check valve 64 to admit air at atmospheric pressure into chamber 54. The check valve 64 has a stem 66 with a face 68 on one end and a cap 70 on the other end. A spring 72 located between the housing surrounding the second inlet 62 and cap 70 biases the face 68 into seat 74 to seal the atmospheric chamber 54 from contaminates such as water vapor which may pass through filter 76 into the system when the pumping means 12 is not operating. A third inlet port 78 from the vacuum chamber 56 connects the switching means 50 to the intake 80 of the pumping means 12.

A valve means 82 located in the switching means 52 controls the flow path of the air supplied to the pumping means 12. The valve means 82 includes a shaft 84 which has a portion 88 on one end 85 retained in a bearing wall 86 in the housing 52 and another end 90 which is secured to a resilient disc 92 thereon located in the vacuum chamber 56. End 85 is resiliently urged by spring 94 toward the vacuum chamber 56 so as to move disc 92 onto seat 96 causing the first inlet port to be sealed from the vacuum chamber 56. A solenoid means 98 surrounds the other end 85 of the shaft 84. The solenoid means 98 is electrically connected to indicator light 100 in the circuit 102 of the stoplight switch means 104.

MODE OF OPERATION OF THE PREFERRED EMBODIMENT

Upon an operator depressing brake pedal 26, the stoplight switch 104 is closed and electrical energy from battery 106 is transmitted to energize light 100 and solenoid means 98. With solenoid means 98 energized, a magnetic attraction will attempt to pull end 85, shaft 84 toward the center of coil 110 by overcoming spring 94. Upon end 85 being moved toward the center of coil 110, disc 92 will seat on partition 112 interrupting air flow from the atmospheric chamber 54 into the vacuum chamber 56. Now the pumping means 12 will evacuate any air in the front chamber 30 to a level which will reinforce the available pressure differential created by the manifold vacuum and atmospheric air pressure alone.

Upon release of the brake pedal, the solenoid means instantaneously is deenergized allowing spring 94 to again shift the air flow through the second and third ports 62 and 78, respectively, to supply the pumping means 12 with air at atmospheric pressure to operate the emission control means 116.

Figure 2:
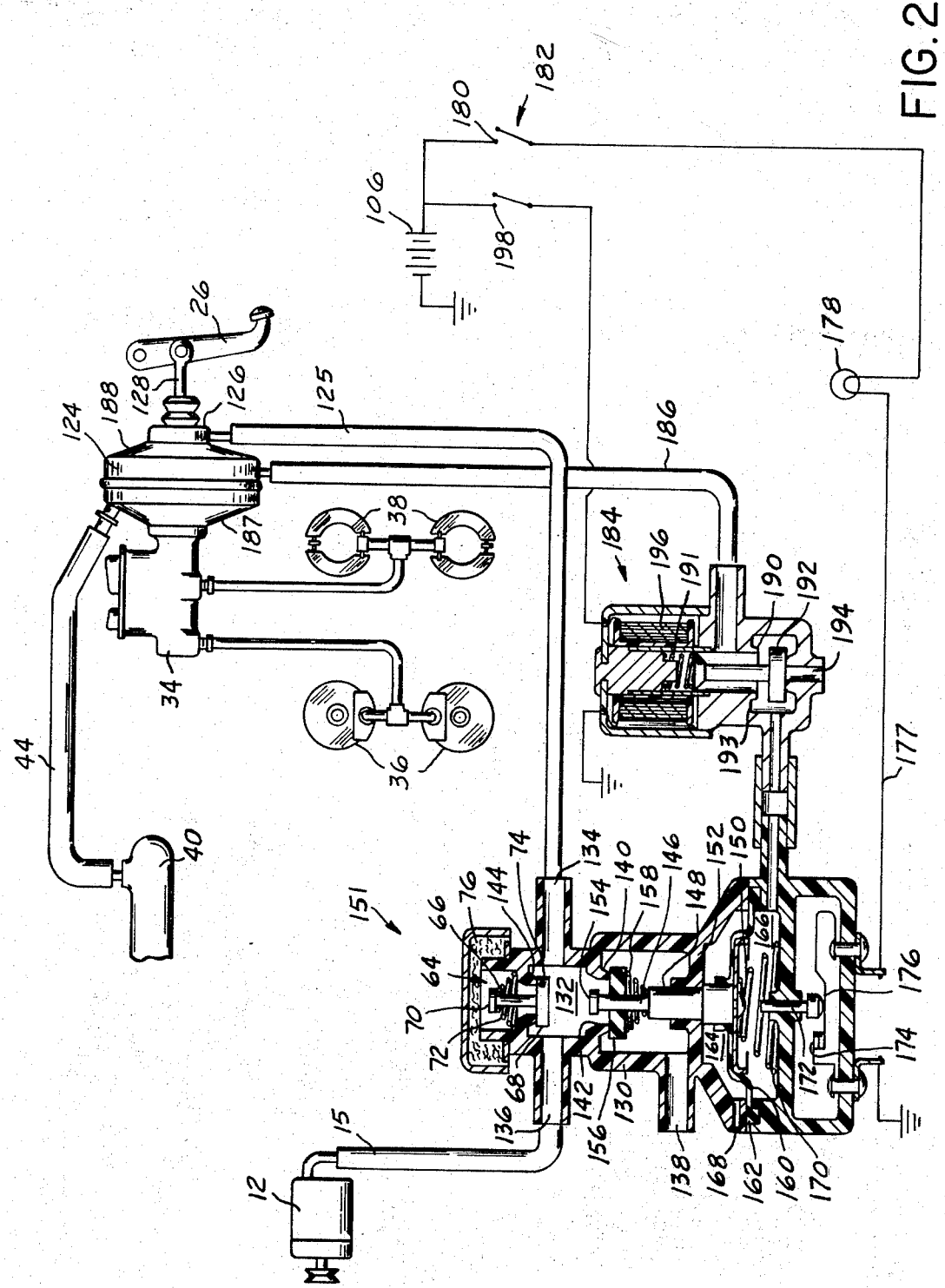
FIG. 2 is a schematic illustration of a braking system for a vehicle wherein air from an emission control pump is selectively diverted to a servomotor means of the braking system in response to an operational signal.

In the embodiment shown in FIGS. 2 and 3 wherein like elements are used, the same reference numeral will be indicated.

In the embodiment shown in FIG. 2, the braking system includes a servomotor 124 similar to that disclosed in the above incorporated U. S. Pat. application Ser. No. 217,903 in order that air under pressure may be introduced into the rear chamber and develop a predetermined operational pressure in the servomotor 124 in response to an operational signal. The operational signal is sensed by the switching means 151 which diverts the air flow available in chamber 132 supplied by the pumping means 12 through conduit 125 to the actuation valve 126. The operation of the actuation valve is controlled by push rod 128 on the brake pedal 26 in response to an operator input.

The switching means 151 includes a housing 130 which has a chamber 132 with a first port 134 connected to the actuation valve 126, a second port 136 connected to conduit 15 coming from the pumping means 12 and a third port 138 connected to the thermo reactor 14. A partition wall 140 with an opening 142 therein separates the first and second ports from the third port. A check valve means 64 is located in an opening 144 to provide a controlled access from the atmosphere to the chamber 132. A shaft 146 has a portion 148 of a first end 150 retained in a bearing wall 152 in the housing 130. A cap 154 retains a resilient disc 156 on shaft 146. The resilient disc 156 is urged toward the partition wall 140 by a spring 158 to separate the first and second ports 134 and 136 from the third port 138 by seating on the housing surrounding the opening 142. A diaphragm 160 secured to the end 150 of the shaft 146 has its periphery 162 secured in the housing 130 to separate an atmospheric chamber 164 from a vacuum chamber 166. Air at atmospheric pressure can freely enter into the atmospheric chamber 164 through passage 168. The vacuum chamber 166 contains a spring 170 which urges the end 150 shaft 146 away from an actuation stem 172 associated with contact points 174 and 176. Contact point 174 is connected to ground while contact 176 is connected to indicator light 178 in the electrical circuit of the run position 180 on the ignition switch 182. The vacuum chamber 166 is connected to a solenoid switch means 184 in conduit 186 going to the rear chamber 188 of the servomotor 124. The solenoid switch means 184 includes a plunger 190 with a disc 192 resiliently positioned over an atmospheric opening 194 in the conduit 186 and a coil 196 adjacent the plunger 190. The coil 196 is connected to the start position 198 on the ignition switch 182.

The mode of operation of this secondary embodiment is as follows:

An operator upon starting his engine will move the switch to close the electrical circuit between battery 106 and start position 198 and simultaneously energize coil 196 of the solenoid swich means 184. With coil 196 energized, magnetic attraction will move plunger 190 to overcome spring 191 and seat disc 192 on the housing 193 adjacent now opened opening 194. With opening 194 opened, air at atmospheric pressure enters the vacuum chamber 166 to allow spring 170 to move end 150 away from stem 172. Contact point 176 because of the resiliency in design will now engage contact 174, closing the electrical circuit 177 causing indicator ight 178 to be energized giving a visual signal that the switching means 150 is operational. Upon the vehicle starting, the ignition switch is moved to run contact 180 interrupting electrical continuity with contact 198 and battery 106. Consequently, the coil 196 is subsequently deenergized allowing spring 191 to seat disc 192 over opening 194. With opening 194 closed, the vacuum present in the rear chamber 188 communicated from the intake manifold 40 through conduit 44 to the servomotor 124. When this vacuum has evacuated the air from the vacuum chamber 166, a pressure differential will be created across diaphragm 160. This pressure differential will overcome spring 170 to move end 150, shaft 146 into contact with actuation stem 172 to open the electrical contacts 174 and 176. With these electrical contacts opened, indicator light 178 is deenergized. The air flow through conduit 15 from the pumping means 12 is communicated through the chamber 132 to the actuation valve 126, however, in order not to diminish the output of the pumping means to the reactor 14, with a predetermined pressure in chamber 132, disc 156 will move against spring 158 to provide a flow path between the second port 136 and the third port 138.

Upon actuation of the servomotor 124 by the operator moving the brake pedal 26, the actuation valve 126 will close the internal vacuum communication between the front chamber 187 and the rear chamber 188 and open the rear chamber to the air flow from the pumping means 12 through conduit 125. As the vacuum is removed from the rear chamber, a similar condition will be present in vacuum chamber 166 allowing the spring 170 to move shaft 146 and resilient disc 156 against the opening 142 to divert all the output from the pumping means 12 to develop the pressure differential in the servomotor. Upon release of the brake pedal, the vacuum communication in the rear chamber 188 and vacuum chamber 166 is again established. Thus, the shaft 146 is again under the influence of the pressure differential across the diaphragm 160 and the air flow of the pumping means uninterrupted in going to the thermo reactor.

In the event that the pumping means is inoperative, the actuation valve 126 is operated by air at atmospheric pressure which can enter into chamber 132 through check valve means 64 and provide a pressure differential with the vacuum in the front chamber 187.

Similarly, if the conduit 44 is severed, the sensing means 151 will divert the air flow into the actuation valve to provide a pressure differential with the atmospheric air in the front chamber 187 to operate the servomotor 124 and supply a power assist to energize the master cylinder 34.

In the embodiment shown in FIG. 3, the switching means 250 includes a housing 202 which has a flow chamber 204, an atmospheric chamber 206, another atmospheric chamber 208 and a sensing chamber 210. A first port 12 connects the atmospheric chamber 206 with the actuation valve 126 of the servomotor 124. A check valve means 64 closes atmospheric opening 214 into the atmospheric chamber 206 while passage 216 into the atmospheric chamber 208 freely permits air at atmospheric pressure to one side of a diaphragm 218 which separates the atmospheric chamber 208 from the sensing chamber 210. The sensing chamber 210 is connected to the rear chamber 188 of the servomotor and receives the same vacuum and air pressure that is communicated thereto. The diaphragm 218, connected to a valve means 220, has a resilient disc 222 on one end thereof to seal an opening 224 in the partition wall 226 and separates the atmospheric chamber 206 from the flow chamber 204. A spring 228 located in the sensing chamber 210 acts on the diaphragm in opposition of any pressure differential created thereacross to position the valve means and consequently control the air flow from the pumping means 12 through conduit 15.

With the engine of the vehicle running and producing vacuum at the manifold 40, the rear chamber 188 and sensing chamber 210 are simultaneously evacuated of air. With vacuum in the sensing chamber 210 and air in the atmospheric chamber 208, a pressure differential will be created which will overcome spring 228 to move the disc 222 attached to stem 221 against the housing surrounding opening 224. Now the air flow from the pumping means can freely travel in conduit 15 through port 230 into the flow chamber 204 and out the port 232 to the thermo reactor 14.

Upon an operator moving brake pedal 26, the actuation valve 126 terminates vacuum communication between the rear chamber 188 and the front chamber 187 and opens atmospheric communication between chamber 206. As the air is atmospheric pressure occupies the vacuum in the rear chamber, a similar situation will occur in the sensing chamber 210 until the pressure differential across diaphragm 218 is eliminated.

Thus, spring 228 will move valve means 220 to seat disc 222 on the port 232 diverting the air flow from the pumping means through the opening 224 in the partition and out port 212 through conduit 240 to the actuation valve 126. The actuation valve 122 directs this air flow into the rear chamber 188 to reinforce the operational pressure differential of the servomotor 124.

Upon release of the brake pedal 26, vacuum from the intake manifold will again suspend the servomotor and a pressure differential will be developed across diaphragm 218 to return the air flow from the pumping means 12 to the thermo reactor 14.

Thus, we have provided a braking system with a means of selectively utilizing the air flow from a pumping means to reinforce a pressure differential created in the servomotor of the power braking system.

We claim:

1. In a vehicle having a pumping means which supplies an emission control means with a quantity of air flow under pressure, and a braking system powered by servomotor means which is operated by the creation of a pressure differential between vacuum and air pressure across a wall means separating a front chamber from a rear chamber by removing vacuum communication in the air chamber in response to an actuation valve moved by an operator, switching means responsive to an operational signal for reinforcing said pressure differential in said servomotor through diversion of the air flow associated with said pumping means, said switching means comprising:

a housing having an internal chamber with a first port, a second port and a third port therein, said first port being connected to said servomotor means, said second port and said third port being connected together to provide a first flow path for said air flow of the pumping means;

sensing means located in said housing and connected to said servomotor means for perceiving said operational signal; and valve means located in said housing and connected to said sensing means for sealing one of said second and third ports upon said operational signal being perceived to establish uninterrupted communication between the first port and the other of said second and third ports to develop a second flow path for said air flow, said air flow in the second flow path acting on said wall means to increase the operational output of the servomotor means.

2. The switching means, as recited in claim 1, wherein said valve means includes:

a shaft having one end extending through an opening in a partition separating said second port from said first port and said third port and another end retained in a bearing wall of said housing; and a resilient disc located on said one end, said resilient disc being adapted to seal said first port during air flow in said first flow path and to seal said opening in the partition with air flow in the second flow path.

3. The switching means, as recited in claim 2, wherein said sensing means includes:

solenoid means located in said housing adjacent said other end of said shaft, said solenoid means being activated in conjunction with a brake indication light to immediately move said shaft through magnetic attraction with said other end to seat said disc on the partition.

4. The switching means, as recited in claim 3, wherein said second flow path is connected to intensify said vacuum in the servomotor.

5. The switching means, as recited in claim 2, wherein said switching means includes:
a diaphragm attached to said other end of the shaft having its periphery secured to said housing for dividing a portion of the cavity into a first atmospheric chamber and a vacuum chamber, said vacuum chamber being connected to said rear chamber to receive the vacuum in the rear chamber, said housing having a first passage through which air is freely communicated to said first atmospheric chamber, said air in the first atmospheric chamber and vacuum in the vacuum chamber creating a second pressure differential which overcomes a resilient means and holds said disc against the partition to allow said air flow to follow said first flow path.

6. The switching means, as recited in claim 5, wherein said housing further includes:
a second atmospheric chamber adjacent said partition having a second passage from the atmosphere into the second atmospheric chamber; and
allowing air to flow from the atmosphere into said second atmospheric chamber while preventing backflow therethrough, said first port being connected to said actuation valve to allow air at atmospheric pressure to be communicated to the rear chamber upon operational engagement by the operator to simultaneously create said first pressure differential in said servomotor means and eliminate the second pressure differential across siad diaphragm and allow the resilient means to seat on the housing interrupting air flow through said third port and permit said air flow access to said second flow path.

7. The switching means, as recited in claim 6, wherein said air flow in said second path enters said second atmospheric chamber above atmospheric pressure closing said check valve means and entering said rear chamber to create said first pressure differential across said wall means through vacuum and air pressure above atmospheric pressure.

8. The switching means, as recited in claim 1, wherein said valve means includes:
a first shaft having one end extending through an opening in a partition separating said third port from said first port and said second port and another end retained in a bearing wall in said housing; and
a resilient disc located on said one end, said resilient disc being adapted to seal said opening in the partition with air flowing in said second flow path.

9. The switching means, as recited in claim 8, wherein said sensing means includes:
a diaphragm attached to the other end of the first shaft having its periphery secured to said housing for dividing a portion of said cavity into a first atmospheric chamber and a vacuum chamber, said vacuum chamber being connected to said rear chamber to receive the vacuum available to the rear chamber, said housing having a first passage adjacent said partition through which air is freely communicated to said first atmospheric chamber, said air in the first atmospheric chamber and vacuum in the vacuum chamber creating a second pressure differential which overcomes a resilient means and holds said disc away from said partition to allow said air flow to follow said first flow path.

10. The switching means, as recited in claim 9, wherein said housing further includes:
a second atmospheric chamber adjacent said cavity with a second passage therebetween; and
check valve means located in said second passage for allowing air at atmospheric pressure to flow into the cavity while preventing backflow therethrough, said first port being connected to said actuation valve to allow air at atmospheric pressure and the air flow from the pumping means to the rear chamber to create said first pressure differential in said servomotor means and eliminate the second pressure differential across said diaphragm, said second resilient means moving siad first shaft with the elimination of said second pressure differential to seat said disc on said partition to interrupt air flow through said third port and shift said air flow to said second flow path.

11. The switching means, as recited in claim 10 further including:
a second shaft retained in said housing having a cap on one end and a head on the other end, said head being located in said vacuum chamber, said cap being located in a monitoring chamber; and
electrical contact means located in said monitoring chamber and engageable with said cap to supply an indicator with a signal to give a visual sign of the flow path the air flow from the pumping means is traversing.

12. The switching means, as recited in claim 11 further including:
solenoid means having a resiliently positioned plunger for sealing an atmospheric opening in the connection between the vacuum chamber and the rear chamber, said solenoid means being actuated upon an operator positioning an ignition switch to start allowing air at atmospheric pressure to enter said vacuum chamber whereby said resilient means will move said first shaft away from said second shaft to permit the electrical contact to transmit said signal.

* * * * *